Figure 1:
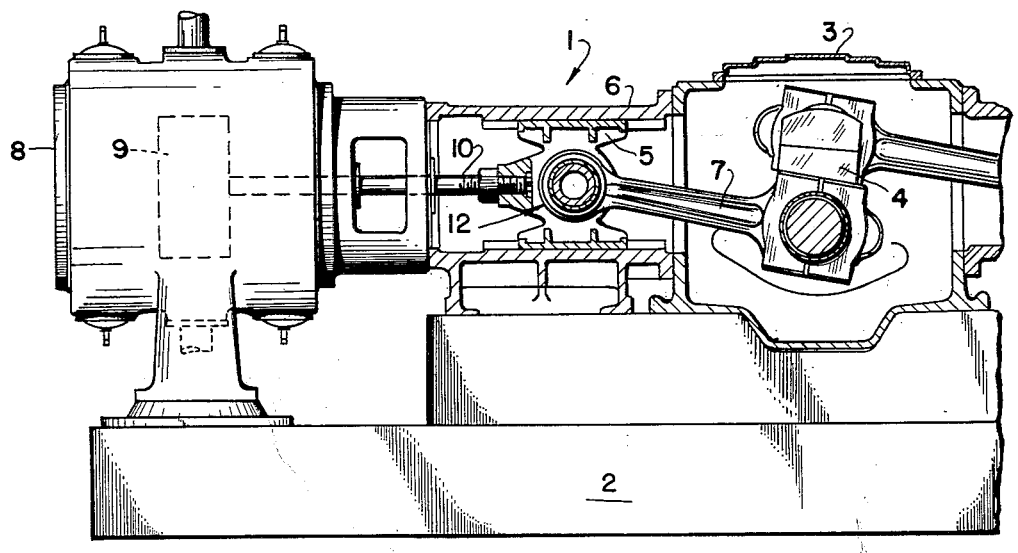

May 5, 1964          C. E. BLANK          3,131,785

MACHINE BEARING LUBRICATION APPARATUS

Filed June 14, 1962          2 Sheets-Sheet 1

INVENTOR
CHARLES E. BLANK
BY
Daniel W. Tillott
HIS ATTORNEY

May 5, 1964 C. E. BLANK 3,131,785
MACHINE BEARING LUBRICATION APPARATUS
Filed June 14, 1962 2 Sheets-Sheet 2

INVENTOR
CHARLES E. BLANK
BY David W. Tillotson
HIS ATTORNEY 3,131,785
MACHINE BEARING LUBRICATION APPARATUS
Charles E. Blank, Painted Post, N.Y., assignor to Ingersoll-Rand Company, New York, N.Y., a corporation of New Jersey
Filed June 14, 1962, Ser. No. 202,458
8 Claims. (Cl. 184—6)

This invention relates to apparatus for lubricating the bearings of reciprocating machines, such as pumps and compressors and particularly to reciprocating machines which may operate under conditions which subject the pistons, connecting rods and crankshafts of such machines to non-reversing loads for extended periods of time.

Normally, it is much less a problem to lubricate the bearings of reciprocating machines operating under reversing loads, since the alternate "pulling" and "pushing" forces applied to their pistons, connecting rods and crankshafts alternately shift the bearing loads to opposite sides or sections of the bearings. Continually shifting the bearing loads to different sections of a bearing allows the oil or lubricant to flow easily to the unloaded sections of the bearing for renewing the lubricating film thereon and prevents any one section of the bearing from being continually loaded for an unduly long period of time sufficient to break down the lubricating film on that section and cause damage to the bearing.

Reciprocating machines operating under non-reversing loads provide increased bearing lubrication problems, since certain sections of their bearings are constantly under loads which prevent or interfere with the renewal of the lubricant film on those loaded sections of the bearings.

The principal object of this invention is to eliminate or substantially minimize the bearing lubrication problems in reciprocating machines operating under non-reversing loads.

Other important objects of this invention are: to provide an apparatus for lubricating the bearings in reciprocating machines subjected to non-reversing loads; to provide an improved lubricant pumping apparatus for reciprocating machines; to provide an improved crosshead bearing particularly adapted for use in reciprocating machines operating under non-reversing loads; to provide a lubricant pump which is powered by the inertial energy produced by the reciprocation of a reciprocating machine; and to provide a bearing which is effective to restrict the lubricating pressure to a segment of its surface during a selected portion of the operating cycle of a reciprocating machine containing such bearing.

Some of the above objects are accomplished by providing a bearing sleeve with two distinct bearing surface areas which are angularly or circumferentially separated from each other, feeding lubricant to each distinct bearing surface area through separate passages, and providing the bearing sleeve and its journal with valve means operative to close one of the passages during a portion of the angular rotation of the journal in the sleeve, said valve means being operative to open said one passage during another portion of the angular rotation of the journal in the bearing sleeve. When the bearing surface area, which is fed lubricant continuously, carries a continuous non-reversible load, all of the available lubricant pressure can be concentrated in the loaded portion of the bearing during the moment when the load on that portion of the bearing is at a minimum. Thus, the lubricant pressure is more likely to force lubricant over the loaded portion of the bearing.

In order to insure that the lubricant pressure is great enough to lubricate the loaded portion of the bearing during the moment of minimum load, this invention provides an inertia actuated pump mounted on a reciprocating element and operative to provide the lubricant with increased pressure during the moment of minimum load and when the non-loaded portion of the bearing is isolated from the lubricant under pressure by the valve means.

Figure 2:
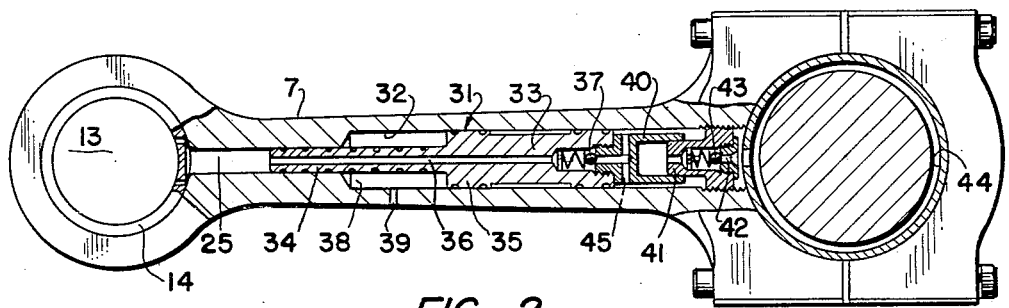
Figure 3:
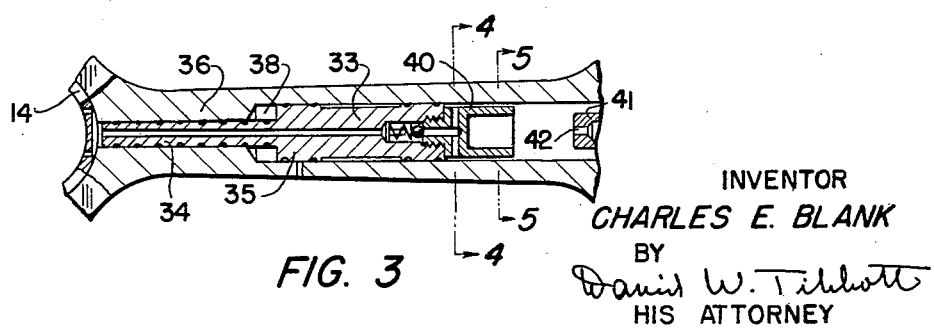
Figure 4:
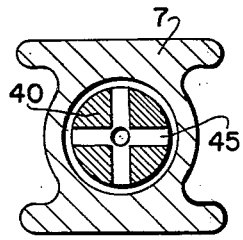
Figure 5:
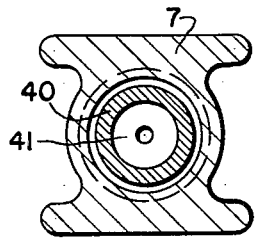
Figure 8:
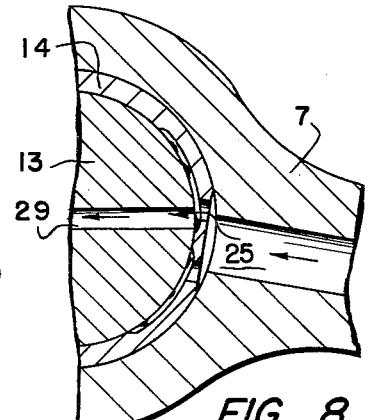
Figure 6:
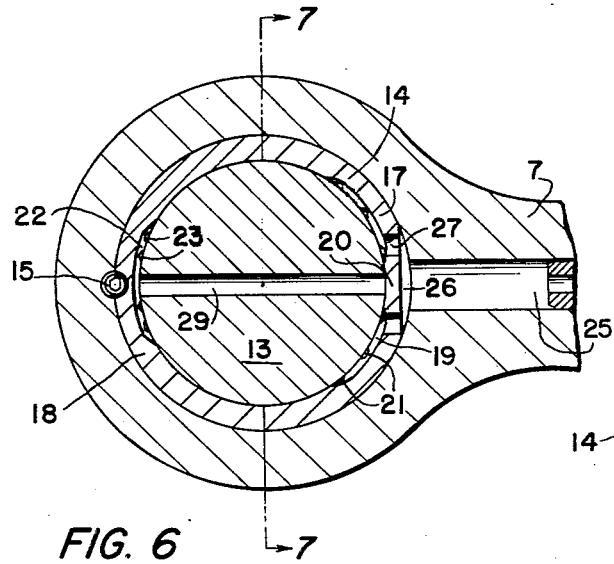
Figure 7:
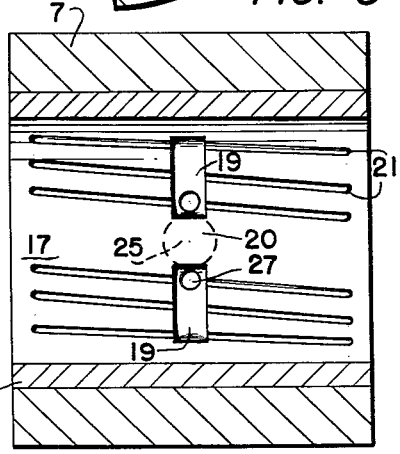
Figure 9:
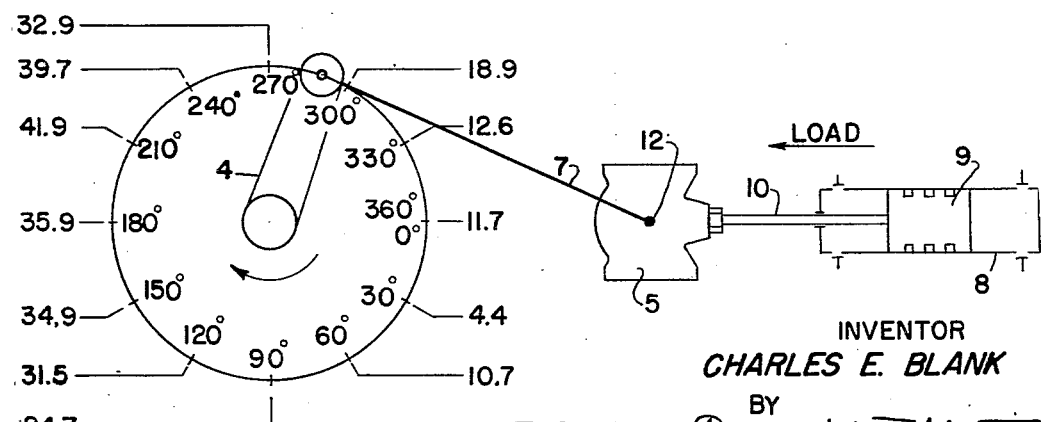

The invention is described in connection with the accompanying drawings wherein:

FIG. 1 is a vertical section of a part of a reciprocating air compressor;
FIG. 2 is an enlarged elevational view of a connecting rod of the compressor of FIG. 1 with portions being broken away to illustrate structural details of an inertia oil pump contained in the connecting rod;
FIG. 3 is similar to FIG. 2 with the pump plunger located at the forward end of its stroke;
FIG. 4 is a section taken on line 4—4 of FIG. 3;
FIG. 5 is a section taken on line 5—5 of FIG. 3;
FIG. 6 is a vertical transverse section taken through the journal pin of the crosshead of FIG. 1 and showing the end of the connecting rod engaging the crosshead journal;
FIG. 7 is a section taken on line 7—7 of FIG. 6 with the journal being omitted to show the inside surface of the bearing sleeve carried by the connecting rod;
FIG. 8 is a fragment of FIG. 6 and showing the journal in a different angular position relative to the bearing; and
FIG. 9 is a diagrammatic view of a reciprocating compressor operating under a non-reversing load and showing representative load values at 30° intervals of the rotation of the crankshaft.

The reciprocating air compressor 1 shown in FIG. 1 of the drawings include the following conventional structure: a base or foundation 2; a crankcase 3; a crankshaft 4 rotating in the crankcase 3; a crosshead 5 mounted for horizontal sliding movement in a crosshead guide 6; a connecting rod 7 interconnecting and pivoted to the crankshaft 4 and the crosshead 5; a cylinder 8; a piston 9 (shown in dotted lines) reciprocating in the cylinder 8; and a piston rod 10 interconnecting and fixed to both the piston 9 and the crosshead 5.

An embodiment of the bearing lubrication apparatus of this invention is shown in the drawings as arranged to lubricate the pivot connection or bearing 12 between the connecting rod 7 and the crosshead 5. The crosshead bearing connection 12 includes a journal pin 13 fixed in the crosshead 5 and a bearing bushing or sleeve 14 mounted in the outer end of the connecting rod 7 embracing and rotating on the journal pin 13. As shown in FIG. 6, the bearing sleeve 14 is press-fitted into the eye bore of the connecting rod 7 and prevented from rotating therein by a dowel screw 15 which fits between the outer circumference of the sleeve 14 and the interior of the connecting rod eye and is parallel to the axis of the sleeve 14.

The interior surface of the bearing sleeve 14 includes two major load bearing sectors or areas which are angularly spaced from each other. These areas include a "pushing" load area 17 located in the portion of the sleeve 14 which is nearest to the crankshaft 4 and a "pulling" load area 18 located in the portion of the sleeve 14 nearest the piston 9. It is easily seen that the crosshead journal pin 13 is pressed against the "pushing" load area 17 of the bearing sleeve 14 when the crankshaft 4 is pushing the piston 9 and that the journal pin 13 is pressed against the "pulling" load area 18 of the sleeve 14 when the crankshaft 4 is pulling the piston 9.

FIG. 7 shows the "pushing" load area 17 of the bearing sleeve 14. It includes a pair of arcuate circumferentially extending lubricant supply channels 19 located midway of the ends of the bearing sleeve 14 and angularly separated by a non-grooved portion or land 20 located midway of the circumferential extent of the "pushing" load area. The channels 19 communicate with the inner ends of a series of smaller grooves 21 cut into the interior of the bearing sleeve 14 along slightly spiral paths extending outward toward the ends of the bearing sleeve 14 and terminating before reaching the sleeve ends. Lubricant supplied to the main channels 19 flows outwardly along the grooves 21 and is distributed over the "pushing" load area 17 of the bearing sleeve 14.

The "pulling" load area 18 of the bearing sleeve includes a single lubricant distribution circumferential channel 22 extending arcuately over the "pulling" load area 18 midway of the ends of the sleeve 14 and a series of spiral grooves 23 which serve the same purpose for the "pulling" load area 18 that the grooves 21 provide for the "pushing" load area 17.

The "pushing" load area 17 of the bearing sleeve 14 receives its lubricant from a longitudinal passageway 25 drilled through the shank of the connecting rod 7. The outer end of the passageway 25 opens into a space 26 formed between the outer circumference of the bearing sleeve 14 and its connecting rod bore, behind the non-grooved land 20 of the "pushing" load area 17. The space 26 opens into the lubricant channels 19 of the "pushing" load area 17 through a pair of angularly spaced ports 27 located on the opposite edges of the non-grooved land 20.

The "pulling" load area 18 of the bearing sleeve 14 receives its lubricant through a diametrical passage 29 running through the crosshead journal pin 13 between the "pushing" load area channels 19 and the "pulling" load area channel 22. As can be seen in FIGS. 6 and 8, the diametrical passage 29 is closed by the non-grooved land 20 during a predetermined portion of the angular rotation of the connecting rod 7 on the journal pin 13. Hence, the passage 29 is closed when the connecting rod 7 is located on the journal pin 13 in the angular position shown in FIG. 6 and is not closed by the land 20 when the rod 7 is rotated to the angular position shown in FIG. 8. In effect, the land 20 serves as a valve means for opening and closing the passage 29. This arrangement is provided so that the lubricant pressure in the rod passageway 25 can be concentrated and limited to the "pushing" load area 17 of the bearing sleeve 14 during a portion of the rotation of the connecting rod 7 on the crosshead journal pin 13.

The oil or lubricant in the connecting rod passageway 25 is placed under additional pressure during a portion of the reciprocation cycle of the rod 7 by an inertia actuated pump 31 contained in the shank of the connecting rod 7. This pump 31 includes an enlarged cylindrical bore 32 in the rod 7 connected to the inner end of the smaller passageway 25 and a stepped diameter piston 33 having a small diameter nose 34 sliding in the passageway 25 and an enlarged head 35 sliding in the cylindrical bore 32. Lubricant is supplied to the passageway 25 through an axial passage 36 in the piston 33 and having a ball check valve 37 at its rear end to allow lubricant to flow freely into the passageway 25 and to prevent it from escaping backwards through the axial passage 36.

Means is provided to dampen or snub the piston 33 at both ends of its reciprocating travel in the connecting rod 7. The snubbing means for snubbing the piston 33 at the forward end of its pumping stroke comprises the annular chamber 38 formed by the end of the enlarged bore 32 and the piston head 35. The enlarged bore 32 has a radial vent 39 drilled in its wall and spaced from its front end so that as the piston 33 initially moves forward during its pumping stroke, oil can escape freely from the chamber 38 through the vent 39, thus having little or no effect on the forward travel of the piston 33. Eventually, during its forward travel, the piston head 35 passes the vent 39 and closes the annular chamber 38, causing the oil in the chamber 38 to be trapped and compressed and the piston 33 to be braked or snubbed to a halt. Normally, sufficient oil flows into the chamber 38, to provide this dashpot effect, by the leakage of the oil between the engaging surfaces of the piston 33 and the adjacent bore in the connecting rod 7.

The means for snubbing the piston 33 at the end of its retraction stroke includes a rearwardly opening cup 40 fixed on the rear face of the piston head 35 and a stopper or plug 41 fixed at the rear end of the enlarged bore 32 and adapted to enter the cup 40, during the retraction of the piston 33, and trap oil therein which causes the piston to be braked to a halt.

Oil flows into the rear of the bore 32 through an axial conduit 42 in the plug 41 containing a ball check valve 43 for preventing the oil from reversing its flow. The ball check valve 43 is connected to the shell bearing 44 at the crank end of the crankshaft 4 to receive oil or lubricant therefrom under the normal oil pressure produced by the conventional lubricating pump (not shown) of the compressor 1.

In order for the oil exiting from the conduit 42 in the plug 41 to reach the piston passage 36, it passes around the outside of the cup 40, which is spaced from the walls of the bore 32 and enters radial holes 45 located at the rear of the piston head 35 leading to the inlet of the ball check 37.

*Operation*

During the operation of the air compressor 1, the crankshaft 4 turns and reciprocates the connecting rod 7, the crosshead 5 and the piston 9 back and forth. The conventional oil pump (not shown) supplies oil under pressure to the connecting rod shell bearing 44 at the crank end of the rod 7 through conventional passages (not shown) in the crankshaft 4. Such oil normally flows, in sequence, through the ball check valve 43 in the plug 41, the conduit 42, around the cup 40, through the radial holes 45, the ball check valve 37 in the piston 33, the axial passage 36 in the piston, and into the rod passageway 25. From the rod passageway 25, the oil flows into the space 26 and through the ports 27 where it is distributed to the "pushing" load area 17 of the bearing sleeve 14. The oil also flows from the ports 27 through the diametrical passage 29 in the crosshead journal pin 13 to the "pulling" load area 18 of the bearing sleeve when the connecting rod 7 is rotated to angles in its travel wherein the diametrical passage 29 is not closed by the land 20 on the sleeve 14, such as shown in FIG. 8.

Under many conditions, the compressor 1 will operate so that the load on the connecting rod 7, crosshead 5 and piston 10 alternates between "pushing" and "pulling" loads during each revolution of the crankshaft 4. Under these conditions, the crosshead journal pin 13 is alternately pressed against the "pushing" load area 17 and the "pulling" load area 18 of the bearing sleeve 14. Such a type of operation allows the lubricant film on the various portions to be periodically renewed by the normal lubricant pressure existing in the sleeve 14, since the normal lubricant pressure easily forces the lubricant between the unloaded portions of the sleeve 14 and journal pin 13.

However, a lubrication problem arises when the compressor 1 operates under a non-reversing load. FIG. 9 illustrates a compressor 1 operating under a non-reversing "pushing" load on the piston 9. Under this condition, the journal pin 13 in the crosshead 5 is maintained pressed against the "pushing" load area 17 of the bearing sleeve 14 continuously, thus preventing oil or lubricant from periodically flowing over the "pushing" load areas 17 of the bearing sleeve 14 to renew the lubricant film thereon. Under this condition, the lubrication film on the "pushing" load area 17 soon breaks down and the bearing sleeve 14 is damaged.

One way of lubricating the "pushing" load area 17 of the bearing sleeve 14, operating under the non-reversible load, is to place increased pressure on the lubricant in the "pushing" load area 17, sometime during the revolution of the crankshaft 4, sufficient to lift or raise the journal pin 13 off the "pushing" load area 17 so that the lubricant is forced over the surface of the "pushing" load area 17.

My apparatus accomplishes the above function during a portion of each reciprocation of the crosshead 5 when the nonreversible load is at its minimum value. FIG. 9 illustrates the relative value of "pushing" loads on the crosshead 5 at 30° intervals during one revolution of the crankshaft 4. These load values represent multiples of 1000 lbs. As can be seen, the "pushing" load is a maximum at about 210° rotation of the crankshaft 4 from top dead center, 0°, of the piston 9 and is a minimum immediately after the piston 9 passes top dead center. Hence, is is desirable to renew the lubrication on the "pushing" load area 17 when the load is at its minimum value and the piston has just passed top dead center.

The inertia pump 31 adds its force to the oil or lubricant in the sleeve 14 at the proper moment, just after the piston 9 passes top dead center. As the crankshaft 4 moves from 90° to 270°, as shown in FIG. 9, the inertia pump piston 33 is retracted due to the deceleration and reversal of reciprocating movement of the connecting rod 7. During the retraction of the pump piston 33, the passageway 25 ahead of the pump nose 34 fills with oil. After the crankshaft 4 passes the 270° mark, the connecting rod 7 begins decelerating and the pump piston 33 attempts to maintain its former velocity, thus placing the oil in the passageway 25 under an increased pressure. This increased pressure rises much higher when the crankshaft reaches 0° and the connecting rod 7 reverses its movement. This increased pressure on the oil in the "pushing" load area 17 of the bearing sleeve 14 is sufficient to drive the oil between the journal pin 13 and the sleeve 14, since the "pushing" load is at its minimum value.

At the same time, the diametrical passage 29 in the journal pin 13 is closed by the land 20 on the bearing sleeve 14, as shown in FIG. 6, since the connecting rod 7 and piston 9 are at or near the top dead center position of the piston 9. This closure of the passage 29 restricts and limits the increased oil pressure to the "pushing" load area 17 of the bearing sleeve 14, so that the entire increase in oil pressure is concentrated on the one job of lubricating the "pushing" load area 17, rather than being dissipated in other regions of the bearing sleeve 14.

It will be understood that although only one embodiment of the invention is specifically described, the invention may embrace various other embodiments which are obvious from an understanding of the described embodiment and are embraced within the claims of the invention.

Having described my invention, I claim:

1. A machine bearing apparatus comprising: a cylindrical bearing sleeve; a journal rotatively mounted in said bearing sleeve; conduit means connected to said bearing sleeve for delivering lubricant under pressure to first and second sections of the interior surface of the bearing sleeve; and valve means in said bearing sleeve for restricting the lubricant under pressure to said first section of the bearing sleeve interior during part of the rotary movement of the journal in the bearing sleeve and for allowing the lubricant to flow freely to both sections of the bearing sleeve interior surface during another part of the rotary movement of the journal in said bearing sleeve.

2. The bearing apparatus of claim 1 wherein: each of said first and second sections of the bearing sleeve includes a network of lubricant distributing channels which is not connected to the channels of the other section; said conduit means includes first and second passageways connected to deliver lubricant respectively to said first and second bearing sections; and said valve means is operative to close said second passageway during a part of the angular rotation of said journal in said bearing sleeve so that lubricant delivered to said bearing sleeve under pressure is concentrated in said first section of said bearing sleeve.

3. The bearing apparatus of claim 2 wherein: said second passageway runs between said first and second sections of said bearing surface; and said valve means is provided by said first section of said bearing surface being arranged to block said second passageway during the rotation of said journal in said bearing sleeve through a predetermined angular range of travel and to open said passageway during the rotation of said journal through another angular range.

4. The bearing apparatus of claim 3 wherein: said second passageway is located in said journal; and said first and second sections of said bearing surfaces are angularly displaced from each other around the inner periphery of said bearing sleeve.

5. A pair of reciprocating machine elements in combination with the bearing apparatus of claim 1 in combination with a pair of reciprocating machine elements, wherein: said bearing apparatus rotatively interconnects said pair of reciprocating machine elements; and an inertia actuated pump is mounted in one of said reciprocating machine elements to force lubricant through said lubricant conduit means during a part of the reciprocating movement of said machine elements.

6. The combination of claim 5 wherein said pump includes: a cylinder; and a pump plunger reciprocally mounted in said cylinder and operative to be moved back and forth in the cylinder by the reciprocation of said machine elements.

7. The combination of claim 6 including: a source of lubricant under pressure connected to the inlet of said pump; and a check valve located between said pump plunger and said source to allow lubricant to enter said pump from said source and to block lubricant from returning from the pump to the source.

8. A machine bearing apparatus comprising: a cylindrical bearing sleeve; a journal rotatively mounted in said bearing sleeve; the interior of said bearing sleeve being divided into first and second sections angularly spaced from each other and adapted to receive lubricant for lubricating said journal; a conduit connected to said bearing sleeve for continuously delivering lubricant to said first section; a transverse passage in said journal arranged to interconnect said first and second sections of said bearing sleeve; and a surface in said first section adapted to cover said passage and prevent lubricant from flowing to said second section during part of the rotary movement of the journal in the bearing sleeve.

References Cited in the file of this patent
UNITED STATES PATENTS

| | | |
|---|---|---|
| 503,506 | Traves | Aug. 15, 1893 |
| 1,947,023 | Shoemaker | Feb. 13, 1934 |
| 2,219,785 | Moore | Oct. 29, 1940 |
| 2,916,333 | Johnson | Dec. 8, 1959 |
| 3,056,638 | Hovde | Oct. 2, 1962 |